(12) United States Patent
Yun et al.

(10) Patent No.: US 11,461,066 B2
(45) Date of Patent: Oct. 4, 2022

(54) DISPLAY APPARATUS, CONTENT MANAGEMENT APPARATUS AND METHOD FOR CONTENT MANAGEMENT

(71) Applicant: SAMSUNG ELECTRONICS CO., LTD., Suwon-si (KR)

(72) Inventors: Woo Sik Yun, Suwon-si (KR); Dong Hoon Seo, Suwon-si (KR); Sung-Jae Lee, Suwon-si (KR); Min Chul Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/416,999

(22) PCT Filed: Nov. 13, 2019

(86) PCT No.: PCT/KR2019/015452
§ 371 (c)(1),
(2) Date: Jun. 21, 2021

(87) PCT Pub. No.: WO2020/130361
PCT Pub. Date: Jun. 25, 2020

(65) Prior Publication Data
US 2022/0075586 A1 Mar. 10, 2022

(30) Foreign Application Priority Data

Dec. 18, 2018 (KR) .......................... 10-2018-0164082

(51) Int. Cl.
*G06F 3/14* (2006.01)
*G06Q 30/02* (2012.01)

(52) U.S. Cl.
CPC ....... *G06F 3/1423* (2013.01); *G06Q 30/0277* (2013.01)

(58) Field of Classification Search
CPC . G09F 9/30; G06F 3/14; G06F 16/176; G06F 16/60; G06F 3/0482; H04N 21/812;
(Continued)

(56) References Cited

U.S. PATENT DOCUMENTS 9,245,706 B2 * 1/2016 Yang .......................... H01J 1/63
9,836,792 B2   12/2017 Dixon
(Continued)

FOREIGN PATENT DOCUMENTS

KR   1020100090743 A   8/2010
KR   1020130082924 A   7/2013
(Continued)

OTHER PUBLICATIONS

International Search Report (PCT/ISA/210) dated Mar. 19, 2020 issued by the International Searching Authority in International Application No. PCT/KR2019/015452.

*Primary Examiner* — Koosha Sharifi-Tafreshi
(74) *Attorney, Agent, or Firm* — Sughrue Mion, PLLC

(57) ABSTRACT

A display apparatus according to an embodiment of the disclosure includes a communicator configured to receive content from an external apparatus; a display; and a controller configured to determine whether tag information related to a component of the received content matches predetermined apparatus information, and determine whether to display the content based on the determined result.

12 Claims, 10 Drawing Sheets

(58) Field of Classification Search
CPC ....... H04N 21/41415; H04N 21/23614; H04N 21/2407; H04N 21/266; H04N 21/4223; H04N 21/458; H04N 21/6582; H04N 21/8358; H04N 21/4408; H04N 21/44204; H04N 21/41407; H04N 21/4325; H04N 21/435; H04N 21/44008; H04N 21/4532; H04N 21/4586; H04N 21/4722; H04N 21/6547; G06Q 30/02; G06Q 30/0251; G06Q 30/0261; G06Q 30/06; G09G 2330/12; G09G 2360/145; G09G 2370/04; G09G 2380/06; G09G 5/00

See application file for complete search history.

(56) References Cited

U.S. PATENT DOCUMENTS

| | | | |
|---|---|---|---|
| 9,886,697 | B1 | 2/2018 | Sivertsen |
| 2012/0230537 | A1 | 9/2012 | Takahashi et al. |
| 2013/0054673 | A1* | 2/2013 | Choi ............... G06F 21/84 709/203 |
| 2015/0281765 | A1* | 10/2015 | Lee ............... H04N 21/8133 725/32 |
| 2016/0103923 | A1* | 4/2016 | Thomas ............ G06F 16/9535 715/234 |

FOREIGN PATENT DOCUMENTS

| | | |
|---|---|---|
| KR | 1020140142488 A | 12/2014 |
| KR | 101679791 B1 | 11/2016 |
| KR | 1020180070471 A | 6/2018 |

\* cited by examiner

DISPLAY APPARATUS, CONTENT MANAGEMENT APPARATUS AND METHOD FOR CONTENT MANAGEMENT

TECHNICAL FIELD

The present disclosure relates to a display apparatus capable of displaying content, a content management apparatus, and a content method for content management.

BACKGROUND ART

Recently, a method of reproducing advertisement images through a large format display (LFD) installed outdoors has been used as a method of providing advertisements to potential consumers.

Such a LFD may be installed in a place with a large amount of population, such as a subway station, a movie theater, a bus stop, or a shopping mall, and may provide information to consumers around the corresponding display apparatus by reproducing an advertisement image.

Meanwhile, each of the one or more LFDs may provide different contents including advertisement images. To this end, a user such as a conventional advertiser had to generate different contents to be transmitted to each of one or more LFDs, and in particular, has inconvenience to modify each of the different contents when the authored content needs to be modified.

DISCLOSURE

Technical Problem

Therefore, it is an object of the disclosure to provide a display apparatus capable of displaying content, a content management apparatus, and a content method for content management.

Technical Solution

In accordance with an aspect of the disclosure, there is provided a display apparatus includes: a communicator configured to receive content from an external apparatus; a display; and a controller configured to determine whether tag information related to a component of the received content matches predetermined apparatus information, and determine whether to display the content based on the determined result.

The controller may determine whether each of at least one tagged value included in the tag information matches predetermined apparatus information.

The component may at least one page, and the controller may determine whether tag information of each of the at least one page matches the apparatus information, and control the display to display the content based on a page including the tag information matching the apparatus information.

The component may at least one object constituting a page, and the controller may determine whether tag information of each of the at least one object matches the apparatus information, and control the display to display the content based on an object corresponding to the tag information matching the apparatus information.

The display apparatus may further include a storage, and the controller may extract a page corresponding to the tag information matching the apparatus information from among the at least one page, and control the storage to store the extracted page.

The tag information includes at least one of display time information, display area information, or display effect information for displaying a page or an object included in the content, and the controller is configured to display the content based on the tag information.

In accordance with another aspect of the disclosure, there is provided a content management apparatus includes: a inputter; a communicator configured to communicate with a display apparatus; and a controller, in response to tag information corresponding to a page included in content being input through the inputter, configured to match the page with the tag information corresponding to the page, generate content including the page and the tag information matched with each other, and control the communicator to transmit the generated content to the display apparatus.

The controller, in response to the tag information corresponding to the object constituting the page being input through the inputter, may match the tag information with the object corresponding to the tag information, and to generate content including the object and the tag information matched with each other.

The tag information includes at least one of display time information, display area information, or display effect information for displaying the page or the object.

The tag information includes apparatus information for identifying the display apparatus.

The controller may control the communicator to transmit the generated content to a plurality of display apparatuses.

In accordance with another aspect of the disclosure, there is provided a method for content management includes: receiving tag information corresponding to the page included in content; matching the tag information with a page corresponding to the tag information; and generating content including the page and the tag information matched with each other.

The method for content management may further include receiving tag information corresponding to an object constituting the page; and matching the tag information with the object corresponding to the tag information, and the generating of the content may comprise generating content including the object and the tag information matched with each other.

The tag information includes at least one of display time information, display area information, or display effect information for displaying the page or the object, and the method for content management may further include displaying the content based on the tag information.

The tag information includes apparatus information for identifying the display apparatus.

The method for content management may further include determining whether the tag information of the content matches with predetermined apparatus information, and determining whether to display the content based on the determined result.

The determining whether the tag information of the content matches with predetermined apparatus information, may include determining whether the tag information of a page included in the content matches the apparatus information; and determining a display of a page including the tag information matching the apparatus information.

The determining whether the tag information of the content matches with predetermined apparatus information, may include determining whether the tag information corresponding to an object constituting the page matches the apparatus information.

The method for content management may further include displaying the content based on the object corresponding to the tag information matching the apparatus information.

Advantageous Effects

According to the display apparatus, the content management apparatus, and the method for content management according to an aspect, different pieces of information to be provided by at least one display apparatus can be provided through one content, so that user convenience can be increased, and content authoring and maintenance costs can also be reduced.

MODE OF THE DISCLOSURE

Figure 1:
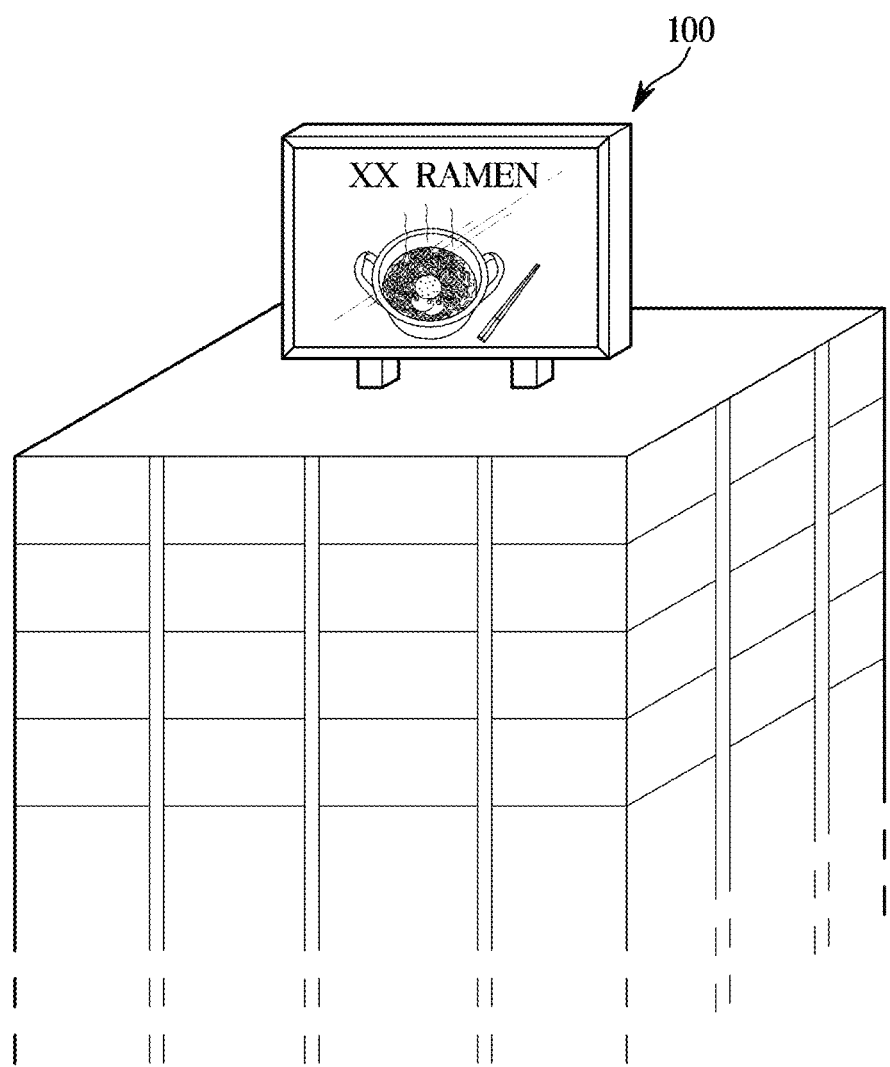
FIGS. 1 and 2 are diagrams schematically showing the appearance of a display apparatus according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, a display apparatus, a content management apparatus, and a method for content management will be described with reference to the accompanying drawings.

Figure 2:
Figure 3:
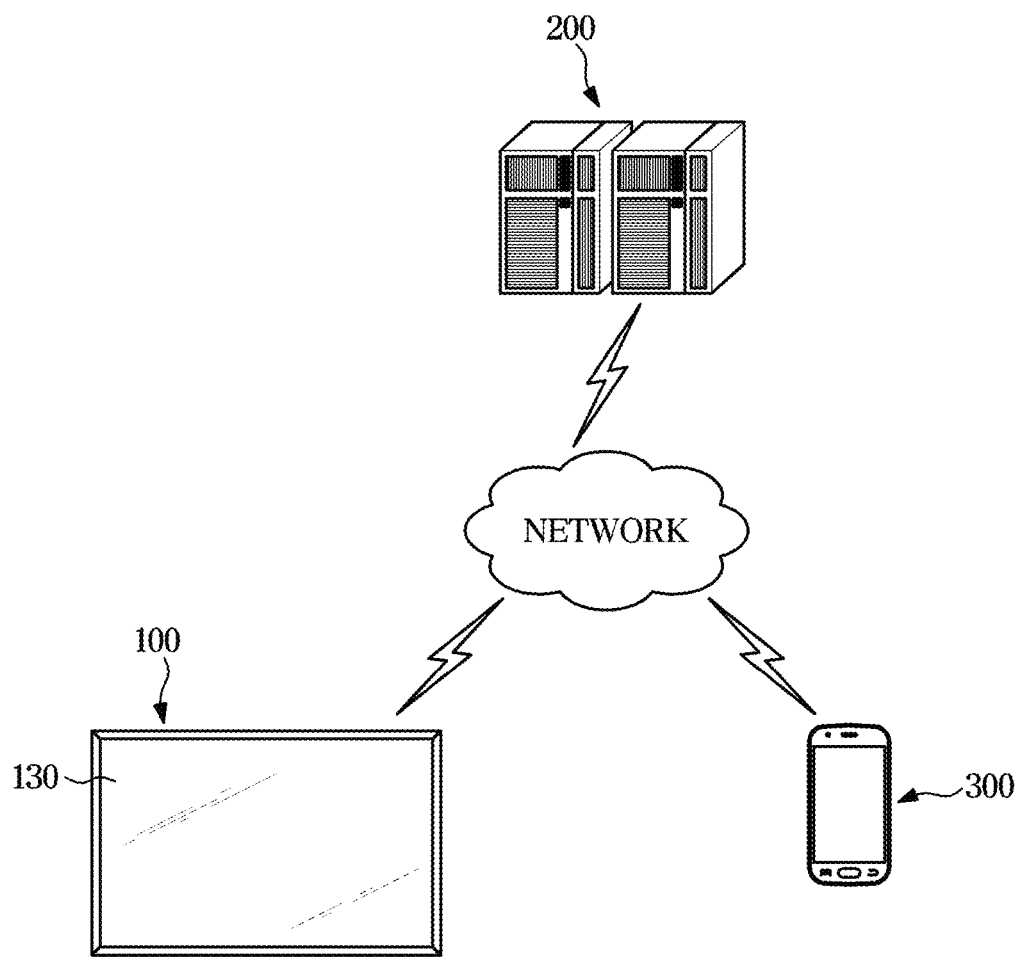
FIG. 3 is a diagram illustrating a relationship between a display apparatus and a content management apparatus according to an embodiment.

FIGS. 1 and 2 are diagrams schematically showing the appearance of a display apparatus according to an embodiment, and FIG. 3 is a diagram illustrating a relationship between a display apparatus and a content management apparatus according to an embodiment.

Referring to the examples of FIGS. 1 and 2, the display apparatus 100 according to an embodiment may be a large format display to be installed outdoors, such as on a roof of a building or at a bus stop. Here, the outdoors may not limited to outdoors, and the display apparatus 100 according to an embodiment may be installed in a place where a large number of people may enter and exit even when it is indoors, such as an inside of a subway station, a shopping mall, a movie theater, a company, or a store.

The display apparatus 100 may reproduce content provided by a user, such as an owner, an administrator, or an advertiser of the display apparatus 100. To this end, the user may generate the content to be reproduced by the display apparatus 100 and transmit it to the display apparatus 100 through the content management apparatus 200 so that the display apparatus 100 may provide information on the corresponding content.

As shown in FIG. 3, a user may generate the content through the content management apparatus 200, and at this time, may access the content management apparatus 200 through a user terminal 300.

The content management apparatus 200 may perform overall management of the content, such as not only generating content, but also modifying or storing the generated content. Hereinafter, it will be described on the premise that content management is an operation including not only generating of the content, but also modifying, changing, and storing of the generated content.

To this end, the content management apparatus 200 may receive a command for the content management including modifying, changing, and storing of the content from the user, and the command for the content management may be received by the user terminal 300 or may be directly received from the user.

The user may input the command for content management through the user terminal 300, and may directly input the command for content management to the content management apparatus 200.

The content management apparatus 200 may manage the content based on a command of the user. The content management apparatus 200 may enable the content to be reproduced by the display apparatus 100 by transmitting the content to the display apparatus 100.

To this end, the content management apparatus 200 may be implemented as an apparatus that may access the display apparatus 100 or the content management apparatus 200 through a network. For example, the content management apparatus 200 may be implemented as a server apparatus.

On the other hand, such content may be an image, and may be an image for advertisement, broadcasting, information, promotion, and the like. In this embodiment, there is no restriction on a matter included in the content, that is, information intended to be provided by the content.

The user terminal 300 may be implemented as a computer or a portable terminal capable of accessing the display apparatus 100 or the content management apparatus 200 through a network. Here, the computer may include, for example, a web browser, a desktop, a laptop, a tablet PC, a slate PC, and the like, and the portable terminal may include, for example, all kinds of handheld-based wireless communication apparatuses such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, smart phone, and the like as a wireless communication apparatus with guaranteed portability and mobility; and a wearable apparatus such as a watch, a ring, a bracelet, an anklet, a necklace, glasses, contact lenses, or a head-mounted-apparatus (HMD).

Meanwhile, a user may generate the content so that each of the at least one display apparatus 100 provides different information in consideration of the position of the display apparatus 100, characteristics of a consumer, and the like. In this case, an apparatus for integrally generating the content for each of the display apparatus 100 to provide different information is required.

Figure 4:
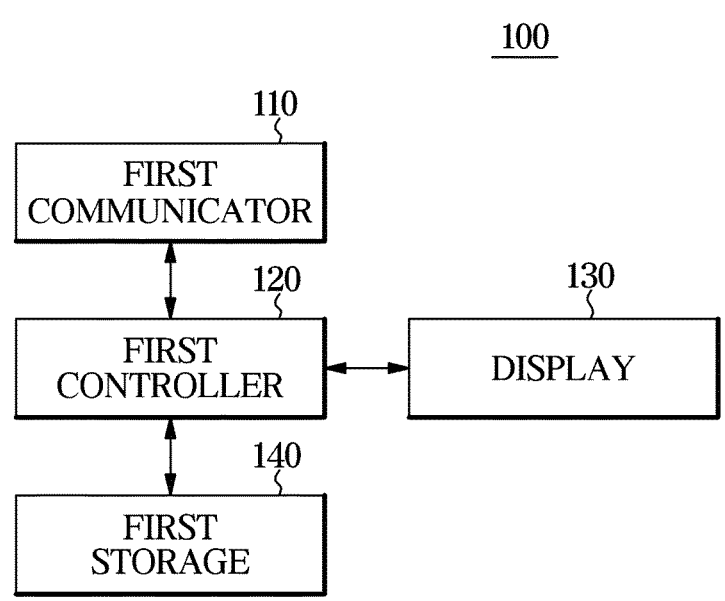
FIG. 4 is a control block diagram of a display apparatus according to an embodiment.
Figure 5:
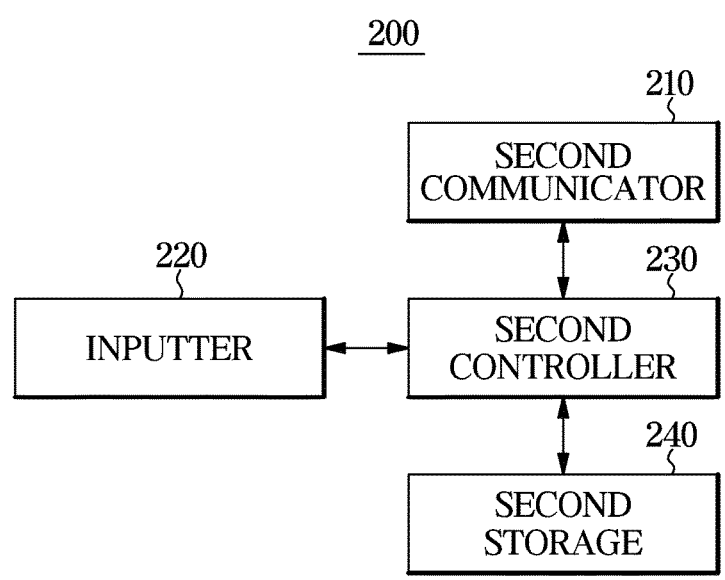
FIG. 5 is a control block diagram of a content management apparatus according to an embodiment.

FIG. 4 is a control block diagram of a display apparatus according to an embodiment, and FIG. 5 is a control block diagram of a content management apparatus according to an embodiment.

The first communicator 110 may receive content from an external apparatus. In this case, the external apparatus may be the content management apparatus 200 or the user terminal 300, and the first communicator 110 may receive the content to be reproduced on the display apparatus 100 from the content management apparatus 200 or the user terminal 300.

The content to be reproduced on the display apparatus 100 may be received from the user terminal 300, and in this case, the user terminal 300 may include a separate playback apparatus such as a computer or a DVD player. Alternatively, the first communicator 110 may receive the content through a wireless communication network, or may receive the content from a recording medium such as USB.

To this end, the first communicator 110 may include one or more components that enable communication with an external apparatus, and for example, may include at least one of a short-range communication module, a wired communication module, and a wireless communication module.

The short-range communication module may include various short-range communication modules that transmit and receive signals using a wireless communication network in a short-range, such as a Bluetooth module, an infrared communication module, a radio frequency identification (RFID) communication module, a wireless local access network (WLAN) communication module, an NFC communication module, and a Zigbee communication module, etc.

The Wired communication module may include various wired communication modules such as Controller Area Network (CAN) communication module, Local Area Network (LAN) module, Wide Area Network (WAN) module, or Value Added Network (VAN) module, etc., and various cable communication modules such as Universal Serial Bus (USB), High Definition Multimedia Interface (HDMI), Digital Visual Interface (DVI), recommended standard232 (RS-232), power line communication, or plain old telephone service (POTS).

The wireless communication module may include a wireless communication interface including an antenna and a transmitter for transmitting a signal related to content. In addition, the wireless communication module may further include a signal conversion module for modulating a digital control signal output from the controller into an analog type wireless signal through a wireless communication interface under control of the controller.

The wireless communication module may include a wireless communication interface including an antenna and a receiver for receiving a signal related to content. In addition, the wireless communication module may further include a signal conversion module for demodulating an analog wireless signal received through the wireless communication interface into a digital control signal.

The display 130 may display content. The display 130 may display content received from the first communicator 110.

In response to the first communicator 110 being receive the content, the display 130 may display the received content, and may display the content at a predetermined time according to a time schedule stored in the first storage 140.

To this end, the display 130 may employ one of various types of display panels as a Cathode Ray Tube (CRT), a Digital Light Processing (DLP) panel, a Plasma Display Penal (PDP), a Liquid Crystal Display (LCD) Panel, an Electro Luminescence (EL) panel, an Electrophoretic Display (EPD) panel, an Electrochromic Display (ECD) panel, a Light Emitting Diode (LED) panel, an organic light emitting diode (OLED) panel or a quantum dot light emitting diode (QLED) panel, but is not limited thereto.

The first controller 120 may perform overall control on the operation of the display apparatus 100. The first controller 120 may determine whether the tag information of the content matches predetermined apparatus information, and may determine whether to display the content based on the determination result.

In this case, the tag information may include apparatus information of the display apparatus 100. In addition to this, the tag information may further include information on a display method of a content 400.

The apparatus information refers to information for identifying the display apparatus 100 and may include a unique code for distinguishing each of the display apparatus 100. In addition, the apparatus information may further include related information of the display apparatus 100. In this case, the related information of the display apparatus 100 means information related to the characteristics of the display apparatus 100, and may include sensor information such as the position of the display apparatus 100, a place, characteristics of a sales stand, characteristics of a target consumer, and a measurement value of a sensor attached to the display apparatus 100.

The tag information may be expressed as at least one tag value, and the tag value may indicate apparatus information of the display apparatus 100 or information related to a method of displaying content.

Specifically, the first controller 120 may determine whether the tag information of the content received by the first communicator 110 matches predetermined apparatus information, and control the display 130 to display the content in response to tag information of the content being match predetermined apparatus information.

The first controller 120 may determine whether each of at least one tag value included in the tag information for the component of the content matches predetermined apparatus information, and control the display 130 to display content corresponding to tag information matching apparatus information.

In this case, the component of the content may include at least one of a page or an object constituting the page. The content may include a plurality of pages, and may further include at least one object constituting each page. Hereinafter, a description of this is described below.

Meanwhile, the first controller 120 may be implemented as an algorithm for controlling the operation of components in the display apparatus 100 or a memory (not shown) for storing data about a program that reproduces the algorithm and a processor (not shown) for performing the above-described operation using data stored in a memory. In this case, the memory and the processor may be implemented as separate chips, respectively. Alternatively, the memory and processor may be implemented as a single chip.

The first storage 140 may store various types of information about the display apparatus 100. The first storage 140 may store information related to content to be reproduced by the display apparatus 100 and store content received from the content management apparatus 200.

To this end, the first storage 140 may be implemented as at least one of a volatile memory apparatus such as a cache, a read only memory (ROM), a programmable ROM (PROM), an erasable programmable ROM (EPROM), an electrically erasable programmable ROM (EEPROM), and a non-flash memory, or a volatile memory apparatus such as a random access memory (RAM) or a storage medium such as a hard disk drive (HDD) or a CD-ROM, but is not limited thereto. The first storage 140 may be a memory implemented as a separate chip from the processor described above in relation to the first controller 120, and may be implemented as a single chip with the processor.

Referring to FIG. 5, the content management apparatus 200 according to an embodiment may include a second communicator 210, an inputter 220, a second controller 230, and a second storage 240.

The second communicator 210 may communicate with the display apparatus 100 or the user terminal 300.

The second communicator 210 may receive a command input by the user from the user terminal 300, and transmit the content generated by the second controller 230 to be described below to the display apparatus 100 based on such a user command.

To this end, the second communicator 210 may include one or more components that enable communication with the external apparatus, and may include, for example, at least one of a short-range communication module, a wired communication module, and a wireless communication module. A detailed description of this is the same as that of the first communicator 110.

The inputter 220 may receive tag information from a user.

The user may input tag information corresponding to the content through the inputter 220. Specifically, the user may input tag information corresponding to the page included in the content through the inputter 220 and may input tag information corresponding to each of at least one page. In this case, the user may input one or more tag values corresponding to each page, and at least one tag value may form tag information and be used as a basis for controlling content generation.

The user may directly input tag information corresponding to the content through the inputter 220, and may indirectly input the tag information by inputting a user command for inputting the tag information through the user terminal 300. In response to the user command for inputting the tag information being received through the user terminal 300, the second controller 230 may determine that tag information corresponding to the received user command is input through the inputter 220.

In order to receive tag information from the user, the inputter 220 may include a software apparatus such as a graphical user interface (GUI). In this case, the GUI or the like may be implemented with a touch pad or the like. In this case, the touch pad may be implemented as a touch screen panel (TSP).

In addition, the inputter 220 may include the same hardware apparatus such as various buttons, switches, pedals, keyboards, mice, track-balls, various levers, handles, sticks, etc. for user input.

In response to being confirmed to be inputting tag information corresponding to the page included in the content, the second controller 230 may generate content including tag information based on the input tag information.

Specifically, the second controller 230 may match at least one page included in the content with tag information corresponding to each of the at least one page, and generate content including the matched page and tag information.

The second controller 230 may control the second communicator 210 to transmit the generated content to the display apparatus 100.

At this time, the second controller 230 may control the second communicator 210 to transmit the generated content to the plurality of display apparatuses 100, and each of the plurality of display apparatuses 100 may reproduce different images based on tag information included in the received content. A description of this is described below.

Meanwhile, the second controller 230 may be implemented as an algorithm for controlling the operation of components in the content management apparatus 200 or a memory (not shown) for storing data on a program that reproduces the algorithm, and a processor (not shown) for performing the above-described operation using data stored in the memory. In this case, the memory and the processor may be implemented as separate chips, respectively. Alternatively, the memory and processor may be implemented as a single chip.

The second storage 240 may store information related to the generated content. The second storage 240 may also store tag information corresponding to at least one of a page or an object included in the content.

To this end, the second storage 240 may be implemented as at least one of a nonvolatile memory apparatus, a volatile memory apparatus, or a storage medium, and the description thereof is the same as that of the first storage 140. Also, the second storage 240 may be a memory implemented as a separate chip from the processor described above in relation to the second controller 230, or may be implemented as a single chip with the processor.

Meanwhile, at least one component may be added or deleted according to the performance of each component of the display apparatus 100 and the content management apparatus 200 illustrated in FIGS. 4 and 5. In addition, it will be readily understood by a person skilled in the art that the mutual positions of the components may be changed in response to the performance or structure of the system.

Meanwhile, each of the components shown in FIGS. 4 and 5 refers to software and/or hardware components such as a Field Programmable Gate Array (FPGA) and an Application Specific Integrated Circuit (ASIC).

Figure 6:
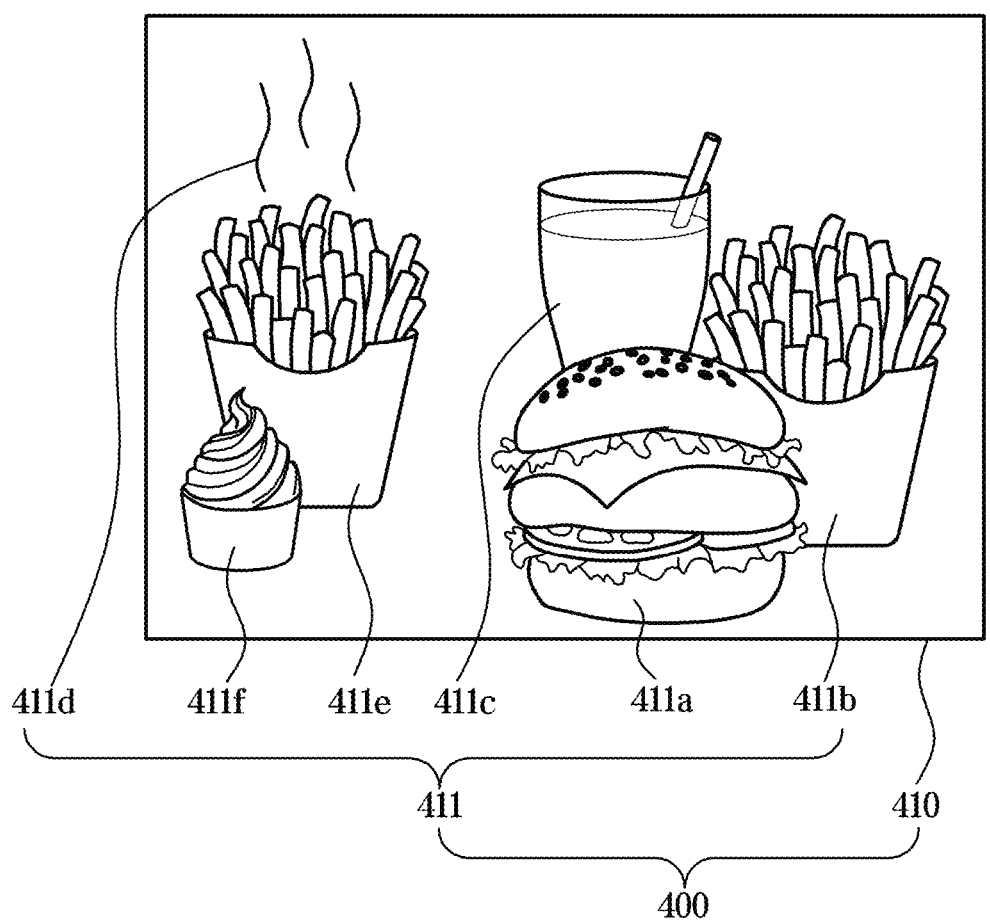
FIG. 6 is a diagram for describing components of content according to an embodiment.

FIG. 6 is a diagram for describing components of content according to an embodiment.

Referring to FIG. 6, the content 400 according to an embodiment may include at least one page 410, and one page 410 may include at least one object 411a, 411b, 411c, 411d, 411e, and 411f In this case, the page 410 may mean a display screen unit to be displayed by the display apparatus 100. For example, in response to the content being an image, the page 410 of the content may be a key frame included in the image, and the page information may include at least one key frame. In addition, the object 411 is a display target constituting a specific page 410, and the content 400 may include at least one object 411a, 411b, 411c, 411d, 411e, and 411f constituting one page 410.

The user may input tag information to correspond to the page included in the content 400. Alternatively, the user may input tag information to correspond to each of at least one object included in the content 400. In this case, the tag information may include apparatus information of the display apparatus 100. In addition to this, the tag information may further include information on a display method of the content 400.

The tag information may further include a display method of the content 400, that is, a display method of each of at least one page 410 or at least one object 411 included in the content 400.

For example, the tag information may include at least one of a display time, a display area, or a display effect of each of at least one page or at least one object. In this case, the display time may mean a time in response to the page or object being displayed. The display area refers to a position where the page or the object is displayed, and the displayed position may refer to a specific position on the display 130 of the display apparatus 100.

In this case, the tag information may be expressed as at least one tag value. A user may set an apparatus for displaying a corresponding page or object or a display method by matching at least one tag value for each of at least one page 410 or at least one object 411 included in the content 400.

Specifically, the user may match at least one tag value with each of at least one page or object included in the content 400. In this case, the tag value may indicate apparatus information of the display apparatus 100 to reproduce the corresponding page or object or information related to a display method of the corresponding page or object.

That is, the user can designate the display apparatus 100 to display each page or object by matching the tag value with regard to each page or object included in the content 400. In other words, in response to the plurality of display apparatus 100, the page or the object to be displayed by each display apparatus 100 may be included in one content by assigning different tag information to each page or object.

To this end, in response to the tag information corresponding to the page included in the content 400 being input, the second controller 230 of the content management apparatus 200 may generate content by matching the page and the tag information corresponding to the page.

Alternatively, in response to the tag information corresponding to the object included in the content 400 being input, the second controller 230 may generate content by matching the object and tag information corresponding to the object.

Specifically, the second controller 230 may match the page with tag information corresponding to the page, and may generate content including the matched page and the tag information. For example, the second controller 230 may match tag values for "Apparatus 1" on a first page and "Apparatus 2" on a second page included in the content, and generate content including the matched page and the tag information.

Alternatively, the second controller 230 may match the object with tag information corresponding to the object, and may generate content including the matched object and the tag information.

For example, as shown in FIG. 6, the second controller 230 may match tag values for "Apparatus 1" on a first object 411a, "Apparatus 2" on a second object 411b, "Apparatus 2" on a third object 411c, "Apparatus 1" on a fourth object 411d, "Apparatus 3" on a fifth object 411e, and "Apparatus 2" on a sixth object 411b, constituting a specific page, and may generate content including the matched page and the tag information. In this case, it is also possible to set tag values for a plurality of apparatuses in a specific page or object.

For example, the second controller 230 may match tag values for "Apparatus 1" and "Apparatus 2" on a first object 411a, and "Apparatus 1" and "Apparatus 3" and "Apparatus 4" on a second object 411b, constituting a specific page, and may generate content including the matched page and the tag information.

In addition, in response to the tag information being include information on a display method of a page or object, that is, a set value for at least one of a display time of a page or object, a display area, or a display effect, the second controller 230 may match each page or object included in the content 400 with a set value for a display method corresponding thereto. The second controller 230 may generate content including the matched page or object and the set value for a display method corresponding thereto. For example, the user may input a tag value for a display time of "1 second", a display area of "lower left", and a display effect of "blink" with respect to the first page. The second controller 230 may match a tag value for the display effect of "1 second", the display area of "lower left" and the display effect of "blink" with respect to the first page included in the content, and may generate content including the matched page and a corresponding tag value.

As another example, the user may input tag values for a display time of "2 seconds", a display area of the "lower right" and a display effect of "zoom-in" with respect to the first object constituting the first page. The second controller 230 may match a tag value for the display time of "2 seconds", the display area of the "lower right" and the display effect of "zoom-in" with respect to the first object constituting the first page, and may generate content including the matched page and a corresponding tag value.

In addition, the tag information may further include related information of the display apparatus 100 to display a page. In this case, the related information of the display apparatus 100 means information related to the characteristics of the display apparatus 100, and may include sensor information such as the position of the display apparatus 100, a place, characteristics of a sales stand, characteristics of a target consumer, and a measurement value of a sensor attached to the display apparatus 100.

The related information of the display apparatus 100 may be matched with each page or object included in the content as tag information.

For example, in response to one content being reproduced by a plurality of adjacent display apparatuses 100, the position of the display apparatus 100 may be divided into relative positions for the plurality of adjacent display apparatuses 100.

As a more specific example, the position of the display apparatus 100 may be expressed in the form of a matrix, and in response to the four display apparatuses 100 being located adjacent to each other in a 2×2 form, a tag value indicating the "lower left position" of the display apparatus 100 at the lower left may be expressed as '#A21'.

The user may match a tag value of "#A21" with a specific page or object, and the second controller 230 may generate content by matching the tag value "A21" to the page or object included in the content. Based on the tag information including the tag value, the display apparatus 100 at the lower left may display the matched page or object.

As another example, the user may input the location of the display apparatus 100 by dividing it into indoors or outdoors as tag information corresponding to each page or object. Based on the user's input, the second controller 230 may generate content by matching a tag value indicating indoors or outdoors (for example, '#outdoor' or '#indoor') to the page or object included in the content.

As another example, the user may input a place where the display apparatus 100 is installed as tag information. More specifically, in response to the place where the display apparatus 100 being installed is a baby goods store, the user may input a tag value related to "infant" to a specific page or object. The second controller 230 may generate content by matching a tag value indicating the place where the display apparatus 100 is installed (for example, '#infant') with a page or object to be displayed in the corresponding place. Each of the display apparatus 100 may reproduce a page or object corresponding to its own installation position based on tag information included in the generated content.

As another example, the user may assign a tag value indicating the characteristics of a sales stand of the display apparatus 100 to a specific page or object as tag information. In this case, the second controller 230 may generate content by matching a tag value indicating the characteristics of a sales stand (for example, '#store entrance' or '#store exit') to a specific page or object included in the content. Each of the display apparatus 100 may reproduce a page or an object corresponding to its own sales stand based on tag information included in the generated content. Accordingly, the page or object corresponding to the characteristics of the sales stand may be displayed by the display apparatus 100 suitable for the characteristics of the sales stand.

As another example, the user may assign a tag value indicating characteristics of a target consumer of the display apparatus 100 to a specific page or object as tag information. In this case, the characteristics of the target consumer means the characteristics of the consumer targeted by the content, and may include characteristics such as the consumer's gender, age, occupation, and consumption pattern.

The second controller 230 may generate content by matching a tag value representing characteristics of a target consumer (for example, the tag value for the target consumer's age may be expressed as '#50s', and the tag value for the target consumer's consumption pattern may be expressed as '#commuting time') to a specific page or object included in the content.

Each of the display apparatus 100 may reproduce the page or object corresponding to the characteristics of its target consumer based on tag information included in the generated content. Accordingly, the page or object corresponding to the characteristics of the target consumer may be displayed by the display apparatus 100 suitable for the characteristics of the target consumer.

As another example, the user may assign a tag value indicating measurement values of various sensors that may be attached to the display apparatus 100 (for example, '#40 dB or less', '#100 lux or less', '#100 μg/m$^3$ or more') to a specific page or object as tag information. The second controller 230 may generate content by matching sensor information including measurement values of various sensors with a specific page or object included in the content.

Each of the display apparatus 100 may reproduce the page or object corresponding to sensor information measured from its own sensor based on tag information included in the generated content. Accordingly, the page or object corresponding to specific sensor information may include a specific sensor and a specific measurement value may be displayed by the measured display apparatus 100.

Through this, the user may assign related information related to various characteristics of the display apparatus 100 in addition to the specific apparatus information of the display apparatus 100 as a tag value of the page or object of the content. Accordingly, even when the content is not generated differently for each display apparatus 100, the page or object suitable for the characteristics of various display apparatuses 100 may be displayed through one content, so that the user's convenience may be increased.

In addition, in response to related information of the display apparatus 100 to display the page being input as tag information, the second controller 230 may recommend apparatus information for a corresponding page or recommend a configuration of tag information, that is, a tag value, to a user based on the related information of the display apparatus 100.

Specifically, the second controller 230 may learn the tag information input by the user and the page or object corresponding to the tag information, and in response to related information of the display apparatus 100 being input, may provide apparatus information on a corresponding page to the user based on the learning data.

Through this, the user may be provided with apparatus information of the display apparatus 100 suitable for the matter of a corresponding page or related information input in response to the corresponding page, even when the user does not know exactly the apparatus information of the display apparatus 100.

In addition, the second controller 230 may provide a configuration of tag information for a corresponding page or object, that is, a tag value, to a user based on the tag information input by the user and the learning data including the page or object corresponding to the tag information.

The second controller 230 may recommend a type of tag information or a tag value suitable for the content of the page or related information input in response to the page to the user, and through this, the user may be provided with specific tag values in consideration of the content of the page or the characteristics of the display apparatus 100 to be displayed.

In response to the content including such tag information being generated, the second controller 230 may transmit the generated tag information to the display apparatus 100.

The display apparatus 100 may determine whether the received content matches predetermined apparatus information, and may determine whether to display the content based on the determined result.

The first controller 120 may determine whether the received content matches the predetermined apparatus information, and may determine whether to display the content based on the determined result. In this case, the predetermined apparatus information may be apparatus information assigned to identify the display apparatus 100, and may be expressed by a predetermined unique code.

In response to the received content being match the predetermined apparatus information, the first controller 120 may display the received content.

Specifically, the first controller 120 may determine whether each of at least one tag value included in the tag information of the content matches the predetermined apparatus information. The first controller 120 may display content based on a page or object of content having a tag value that matches the predetermined apparatus information.

The first controller 120 may determine whether the tag information of the page or object included in the content matches apparatus information, and display content based on the page or object including the tag information matching the apparatus information.

Specifically, the first controller 120 may determine whether a tag value matched with the page included in the content matches the apparatus information, and display only the page corresponding to the tag value matching the apparatus information among at least one page included in the content.

In this case, the tag value matched to the page may provided in plural, and the first controller 120 may determine whether the tag value matching the apparatus information exists among the plurality of tag values. Based on the existence of a tag value that matches the apparatus information, the first controller 120 may determine that the tag information of the corresponding page matches the apparatus information, and display only the page corresponding to the tag value matching the apparatus information among at least one page included in the content.

In addition, the first controller 120 may determine whether the tag information corresponding to the object included in the content matches the apparatus information, and display the content based on the object corresponding to the tag information matching the apparatus information.

That is, the first controller 120 may determine whether the tag value matched with the object included in the content matches the apparatus information, and display the content based on the object corresponding to a tag value that matches apparatus information among the object.

In this case, in response to the tag information matched with the object being include not only apparatus information but also information related to the display method, the first controller 120 may display the content based on the display method included in the tag information.

In addition, the first controller 120 may display the page corresponding to the tag information matching the apparatus information, based on information related to a method of displaying the tag information.

Through this, the first controller 120 may not display all page or object included in the received content, display only page or object related to the display apparatus 100, and vary according to the tag information assigned to each page or object.

Accordingly, even in response to the same content being received, the display apparatus 100 may display only pages related to itself, and the display method may vary for each page or object, thereby enabling efficient content management.

In addition, the first controller 120 may extract a page corresponding to the tag information matching the predetermined apparatus information from among at least one page included in the content, and store the extracted page.

Alternatively, the first controller 120 may extract an object corresponding to the tag information matching the predetermined apparatus information from among at least one object included in one page, and store the extracted object.

That is, the first controller 120 may not store all page or object included in the content, and store only page or object corresponding to the tag information matching the apparatus information among page or object included in the content, that is, page or object to be displayed. Through this, efficient storage capacity management is possible.

Also, the first controller 120 may determine whether a page or object related to the apparatus information exists based on the tag information included in the content. In this case, the apparatus information may include the location and location of the display apparatus 100, characteristics of the target consumer, equipment information such as attached sensors, and the like, and such apparatus information may be stored in advance.

In response to the presence of a page or object related to apparatus information among related information of the display apparatus 100 included in the content, the first controller 120 may display the related page or object.

To this end, the first controller 120 may compare pre-stored apparatus information with related information of the display apparatus 100 included in tag information corresponding to a specific page or object. As a result of the comparison, in response to the similarity being greater than or equal to a predetermined value, the first controller 120 may determine that the corresponding page or object is related to the apparatus information, and display a page or object related to the apparatus information.

Through this, in addition to the specific code related to the display apparatus 100, the display apparatus 100 may display a page or object related to itself among contents received by the display apparatus 100 itself. Accordingly, the efficiency of content management can be increased.

Figure 7A:
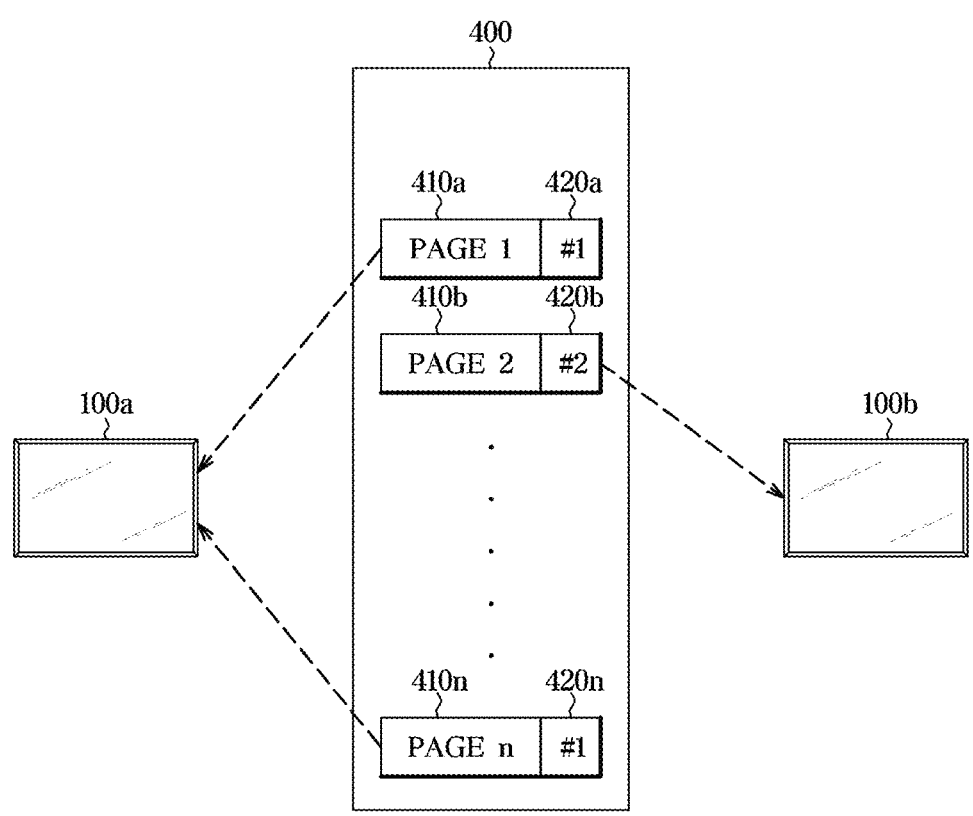
FIGS. 7A and 7B are diagrams for describing an example in which content is displayed by a display apparatus according to an embodiment.

FIG. 7A is diagram for describing an example in which content is displayed by a display apparatus according to an embodiment.

Referring to FIG. 7A, the content management apparatus 200 according to an embodiment may generate content 400 including a first page 410a to which a tag value 420a of "#1" is matched, a second page 410b to which the tag value 420b of "#2" is matched, and a n-th page 410n to which the tag value 420n of "#1" is matched.

The content management apparatus 200 may transmit such content 400 to a plurality of display apparatuses 100. That is, the content management apparatus 200 may transmit the same content 400 to the first display apparatus 100a and the second display apparatus 100b.

At this time, in response to the apparatus information of the first display apparatus 100a being "#1" and the apparatus information of the second display apparatus 100b is "#2", the first display apparatus 100a may display a first page 410a and an n-th page 410n, which are pages corresponding to tag information matching the apparatus information of the received content 400.

The second display apparatus 100b may display the second page 410b, a page that corresponds to the tag information that matches the apparatus information of itself, among the received content 400.

As such, even when one content is generated, the same effect as that of generating content to be separately displayed for each of the plurality of display apparatuses 100 may occur. That is, the user does not need to individually create content to be displayed by each of the plurality of display apparatuses 100, and may manage the content to be displayed by each of the plurality of display apparatuses 100 through one content. Accordingly, user convenience can be increased.

Figure 7B:
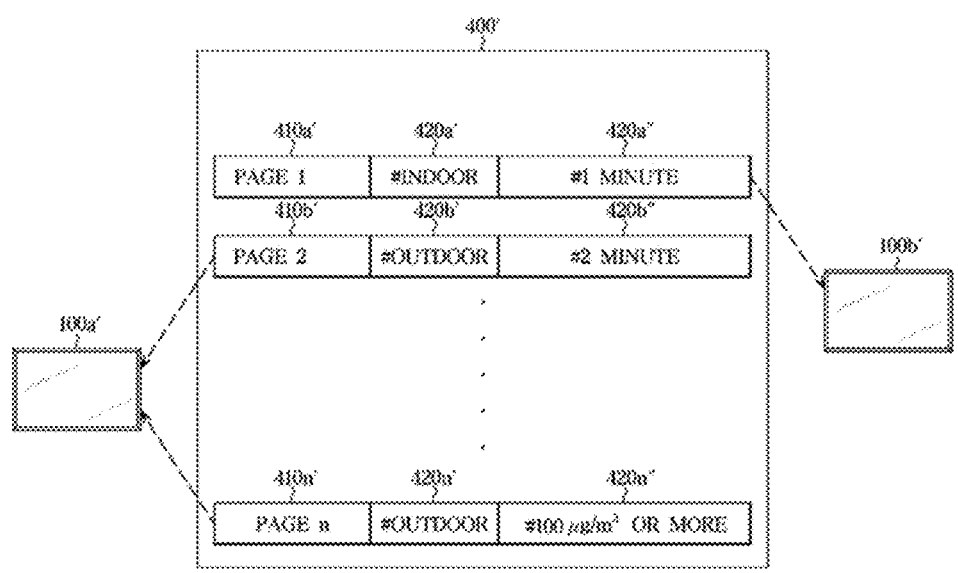

FIG. 7B is diagram for describing an example in which content is displayed by a display apparatus according to an embodiment.

Referring to FIG. 7B, the content management apparatus 200 according to an embodiment may generate content 400' in which tag values 420a' and 420a' of "#indoor" and "#1 minute" are matched with a first page 410a', in which tag values 420b' and 420b' of "#outdoor" and "#2 minutes" are matched with a second page 410b', and in which tag values 420n' and 420n' of "#outdoor" and "#100 µg/m$^3$ or more" are matched with a n-th page 410n'.

Through this, even when one content is generated, the same effect as that of generating content to be separately displayed for each of the plurality of display apparatuses 100 may be generated. That is, the user does not need to individually generate content to be displayed by each of the plurality of display apparatuses 100, and may manage the content to be displayed by each of the plurality of display apparatuses 100 through one content.

In addition, even when the display apparatus 100 to be displayed a specific page or object is not specified, the corresponding page or object may be displayed by the display apparatus 100 suitable for displaying the specific page or object based on tag information. Accordingly, user convenience can be increased.

Figure 8:
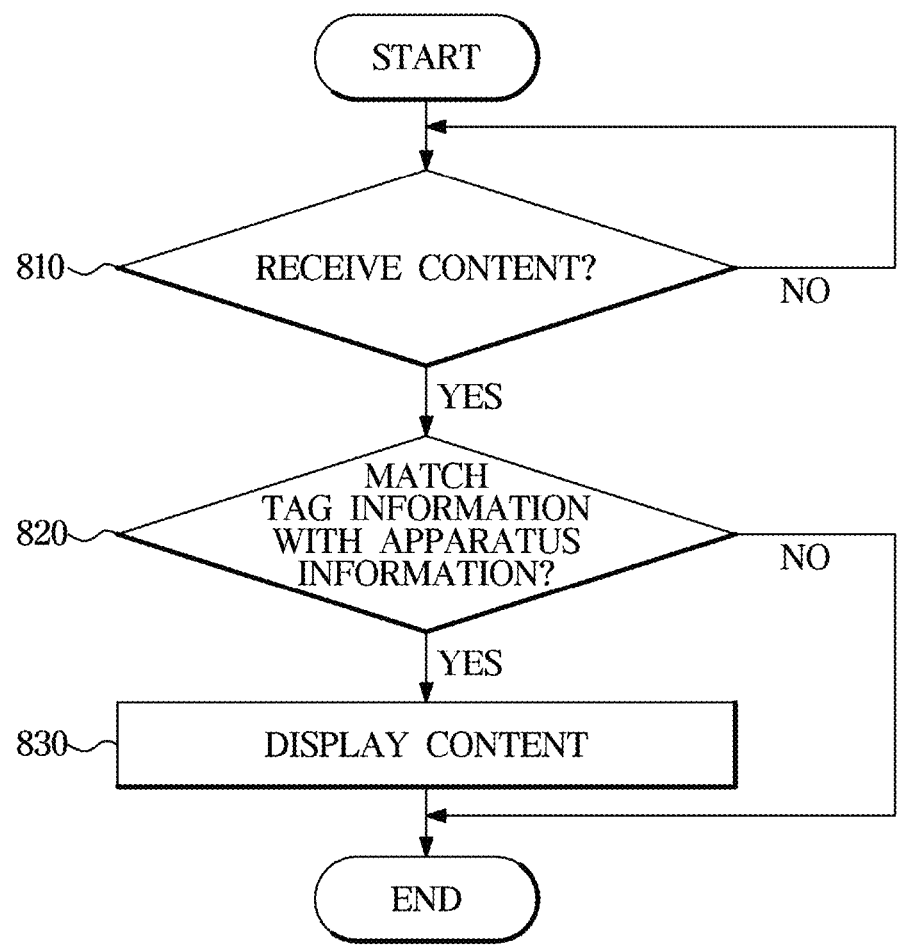
FIG. 8 is a flowchart of a method for content management according to an embodiment.

FIG. 8 is a flowchart of a method for content management according to an embodiment.

The display apparatus 100 according to an embodiment may determine whether the content is received (810).

In response to the content being received (YES in 810), the display apparatus 100 may determine whether the tag information included in the received content matches the apparatus information (820).

In this case, the apparatus information refers to information for identifying the display apparatus 100 and may include a unique code for distinguishing each of the display apparatus 100. In addition, the apparatus information may further include related information of the display apparatus 100.

The related information of the display apparatus 100 refers to information related to the characteristics of the display apparatus 100, and may include sensor information such as a location, a place, a characteristic of a sales stand, a characteristic of a target consumer, and a measurement value of a sensor attached to the display apparatus 100.

Specifically, the display apparatus 100 may determine whether each of at least one tag value included in the tag information of the content matches the predetermined apparatus information.

At this time, the display apparatus 100 may determine whether the tag information of the page included in the content matches the apparatus information, and determine whether the tag value matched with the page included in the content matches the apparatus information.

Alternatively, the display apparatus 100 may determine whether the tag information corresponding to the object included in the content matches the apparatus information, and determine whether the tag value matched with the object included in the content matches the apparatus information.

If it is determined that the tag information of the content matches the apparatus information (YES in 820), the display apparatus 100 may display the content based on the page or object of the content having the tag value matching the apparatus information (830).

Specifically, the display apparatus 100 may display only the page or object corresponding to the tag value matching the apparatus information among at least one page or object included in the content.

Through this, the display apparatus 100 may display only page or object related to the display apparatus 100 without reproducing all page or object included in the received content.

Accordingly, even in response to the same content being received, the display apparatus 100 may display only page or object related to itself, so that efficient information may be provided for each display apparatus 100.

Figure 9:
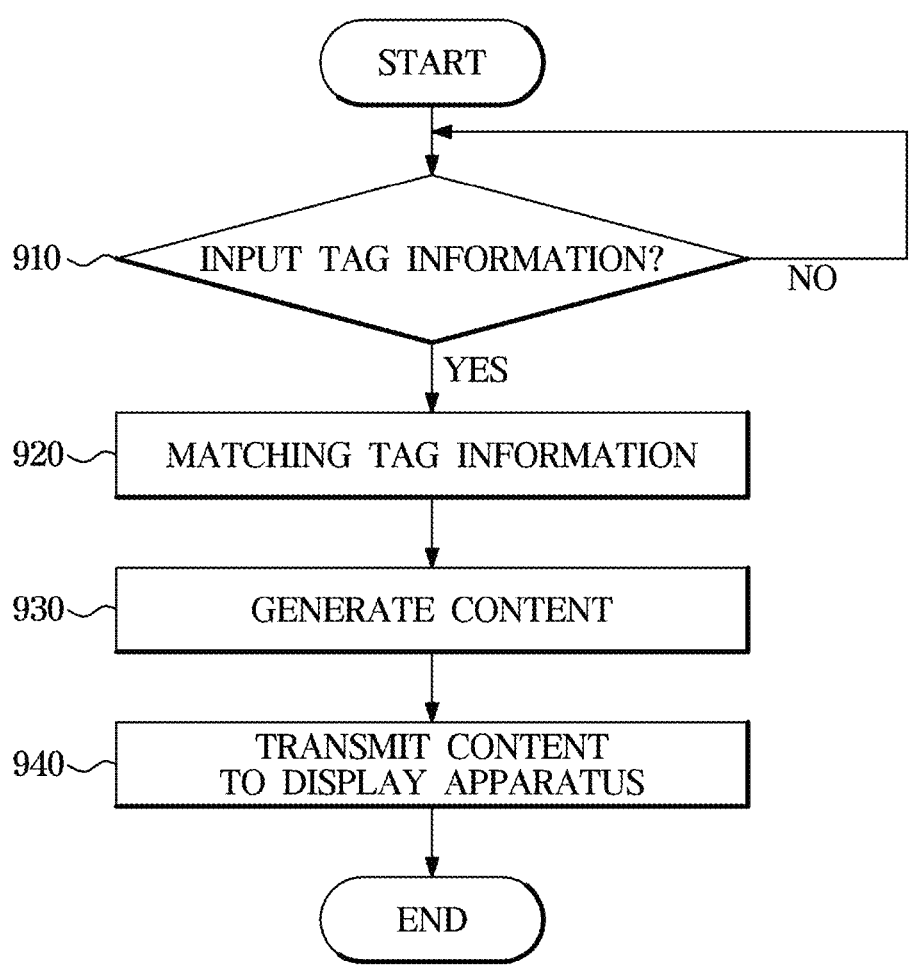
FIG. 9 is a flowchart of a method for content management according to an embodiment.

FIG. 9 is a flowchart of a method for content management according to an embodiment.

The content management apparatus 200 according to an embodiment may determine whether the tag information is input from the user (910).

In this case, the tag information may include at least one tag value corresponding to the page included in the content, and further include at least one tag value indicating the display method for displaying the page included in the content.

In response to the tag information being input (YES in 910), the content management apparatus 200 may match a page included in the content with tag information corresponding to the page (920). In this case, the tag information may include apparatus information of the display apparatus 100. In addition to this, the tag information may further include information related to the method of displaying the content. The content management apparatus 200 may generate content including the matched page and tag information (930).

In response to the content being generated, the content management apparatus 200 may transmit the content to the display apparatus 100 (940). In this case, the content management apparatus 200 may transmit the generated content to the plurality of display apparatuses 100. Each of the plurality of display apparatuses 100 may display a page related to each apparatus information through the process of FIG. 8 described above.

Through this, since the user may manage the content to be displayed by each of the plurality of display apparatuses 100 through one content, the user's convenience may be increased.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A display apparatus, comprising:
a communicator configured to receive content from an external apparatus;
a display; and
a controller configured to determine whether tag information related to a component of the received content matches predetermined apparatus information, and determine whether to display the content based on the determined result,
wherein the component is at least one page, and
wherein the controller is configured to determine whether tag information of each of the at least one page matches the predetermined apparatus information, and control the display to display the content based on a page including the tag information matching the predetermined apparatus information.

2. The display apparatus according to claim 1, wherein the controller is configured to determine whether each of at least one tagged value included in the tag information matches the predetermined apparatus information.

3. The display apparatus according to claim 1, wherein the component is at least one object constituting a page, and
wherein the controller is configured to determine whether the tag information of each of the at least one object matches the predetermined apparatus information, and control the display to display the content based on an object corresponding to tag information matching the predetermined apparatus information.

4. The display apparatus according to claim 1, further comprising a storage, and
wherein the controller is configured to extract a page corresponding to the tag information matching the predetermined apparatus information from among the at least one page, and control the storage to store the extracted page.

5. The display apparatus according to claim 1, wherein the tag information includes at least one of display time information, display area information, or display effect information for displaying a page or an object included in the content, and
the controller is configured to display the content based on the tag information.

6. A content management apparatus, comprising:
an inputter;
a communicator configured to communicate with a display apparatus; and
a controller, in response to tag information corresponding to a page included in content being input through the inputter, configured to match the page with the tag information corresponding to the page, generate content including the page and the tag information matched with each other, and control the communicator to transmit the generated content to the display apparatus.

7. The content management apparatus according to claim 6, wherein
the controller, in response to tag information corresponding to an object constituting the page being input through the inputter, is configured to match the tag information with the object corresponding to the tag information, and to generate content including the object and the tag information matched with each other.

8. The content management apparatus according to claim 7, wherein
the tag information includes at least one of display time information, display area information, or display effect information for displaying the page or the object.

9. The content management apparatus according to claim 6, wherein
the tag information includes predetermined apparatus information for identifying the display apparatus.

10. The content management apparatus according to claim 6, wherein
the controller is configured to control the communicator to transmit the generated content to a plurality of display apparatuses.

11. A method for content management, comprising:
receiving tag information corresponding to a page included in content;
matching the tag information with the page corresponding to the tag information;
generating content including the page and the tag information matched with each other;
receiving tag information corresponding to an object constituting the page; and
matching the tag information with the object corresponding to the tag information,
wherein the generating of the content includes generating content including the object and the tag information matched with each other,
wherein the tag information includes at least one of display time information, display area information, or display effect information for displaying the page or the object, and
wherein the method further comprises displaying the content based on the tag information.

12. The method for content management according to claim 11, wherein
the tag information includes predetermined apparatus information for identifying a display apparatus.

* * * * *